Feb. 1, 1966    J. A. BRADNER    3,232,169
MAIN DRIVE MEANS FOR A GEAR HOBBING MACHINE
Filed Jan. 21, 1963    2 Sheets-Sheet 1

John C. Bradner
INVENTOR.
BY Arthur H. Van Horn
Atty

United States Patent Office 3,232,169
Patented Feb. 1, 1966

3,232,169
MAIN DRIVE MEANS FOR A GEAR HOBBING MACHINE
John A. Bradner, Cleveland, Ohio, assignor to The Lees-Bradner Company, Cleveland, Ohio, a corporation of Ohio
Filed Jan. 21, 1963, Ser. No. 252,656
1 Claim. (Cl. 90—4)

The present invention relates to machine tools such as gear hobbing machines either of the single or multiple spindle type. More particularly, it relates to a more effective main drive mechanism for generating repetitive toothed sections, such as spur gears, splines or helical gears.

The art of producing repetitive toothed sections by the hobbing method is well known and in the past it has been customary to position the main drive motor so that it will be enabled to directly drive a common back shaft which is so connected to the hob, the workpiece shaft and the lead screw as to maintain a proper timed relationship therebetween.

U.S. Patent 2,563,982, issued to H. C. Warner on August 14, 1951, and U.S. Patent 2,481,974 issued to John A. Bradner on September 13, 1949, are good examples of this general arrangement. However, in each of these instances, it will be observed that to solve the problem of achieving a timed relationship between the rotation of the cutting tool of the hob and the workpiece that a common power source such as a main drive motor illustrated at M or M' in U.S. Patent 2,563,982 is employed. Also employed is a common back shaft driven directly by these motors defining a common source of power to cause the hob through selectable change gearing to rotate in the proper timed relationship with the work spindle and the lead screw and to pass into cutting relation with a workpiece on the work-spindle, through and thence out of the workpiece, whereby toothed sections of the desired number of teeth such as spur gears, splines or helical gears will be generated.

In such instances where the main power is transmitted directly through a back shaft and gear trains, these elements are subjected to the severity of strains, stresses and backlash inherent in such systems depending, of course, on the type of work being performed by the hob.

In the art of hobbing, the precise generation of toothed sections is highly necessary and desirable. Patent No. 2,841,974 illustrates in sufficient detail that in the art of producing toothed sections via the hobbing method, the multiplicity of the cutting edges of the cutter or hob moving in a continuing sequence of interrupted cuts as these cutting edges come into, pass through and out of engagement with the workpiece being generated, the power transmitted through the back shaft and a train or trains of gears sets up in the back shaft and gear trains driven thereby shock waves, strains, torsional and other stresses, and backlash in the gear train, not only causing the entire system to chatter noisily, but interferes with and, in fact, prevents attainment of precise generation via the hobbing method of toothed sections, such as gears or splines.

Gear tooth and spline tooth sections may vary over a wide range of sizes. Comparatively heavy pitch, deep toothed sections must be generated with relatively large diameter cutters or hobs, whereas smaller pitch, shallower sections are produced with comparatively much smaller diameter cutters or hobs.

To those skilled in the art, it will be apparent that very large amounts of torque must be supplied at relatively slower hob rotation rates to operate effectively the relatively comparatively large diameter hobs necessary for the generation of gears or splines of heavy section, whereas quite small diameter hobs operating at very much faster rotational rates are employed for the generation of smaller, shallower, lighter pitch gears and splines.

Hence, in the case of the heavier deeper sections being generated and the large diameter hobs necessitated for that generation, very considerable reduction gearing in the hobbing machine's hob head must be provided to preclude the possibility of having to transmit excessive torque through the hobbing machine's extremely complex gear train.

For heavy, coarse pitch work it is accepted practice to provide reduction gearing in the hob head of 12:1 whereby gear train rotation rates can be kept high, and that torque will be minimized therein thereby.

However, when lighter pitch, shallower depth tooth sections are also to be generated on the hobbing machines, much smaller cutters or hobs are employed, operating at very much higher rotational rates, much less torque being needed to drive the smaller diameter, lighter pitch hobs.

However, if these smaller hobs are operated at the higher rotational rates their smaller diameters enable, using the same reduction gear necessary to the usage of the larger, heavier pitch hobs, it will immediately be apparent that thereby the driving train in association with the heavy duty reduction gearing will be seriously over-speeded, necessitating the usage with the smaller hobs of gearing of much less reduction, i.e., the substitution of another hob head incorporating gearing of lesser reduction.

Conversely, if this second head is employed to hob heavy pitch gears with larger diameter hobs, at the slow rotation rates the latter entail, serious over-torquing of the drive train immediately transpires.

Numerous efforts in the past have been made to solve this problem with single compromise hob head reduction gear ratios without success for in every instance the driving train is overspeeded for lighter pitch work or alternatively seriously over-torqued when heavy pitch work is essayed.

It is therefore an important object of the present invention to overcome the difficulties and disadvantages heretofore encountered particularly as indicated hereinabove and to provide a more effective main drive mechanism employed in generating repetitive toothed sections such as spur gears, splines or helical gears by way of the hobbing method.

A further object of this invention resides in a main driving source whereby power to drive the machine is fed directly into the hob head of the machine itself as distinguished from a system wherein the power to drive the machine is transmitted thereto by way of the back shaft and the machine's rather complex attenuated common drive mechanism.

Another object of this invention is to provide a variable speed power source mounted directly on the swiveling portion of the hob head, thereby having a direct power driving connection with the hob or cutter and having a substantially remote power transmitting connection with the machine's back shaft and gear trains.

A further object of the invention is to so locate the main driving source of power for driving the hob or cutter and the associated back shaft and gear trains that strains, stresses and backlash resulting from the intermittent cutting action of the hob will be substantially eliminated from the power transmission system through the back shaft and gear trains.

A further object of this invention is to locate the main drive prime mover with respect to the hob or cutter so as to insure that the power transmitted will be applied most directly to the hob or cutter and more remotely to the back shaft and gear trains.

Another object of this invention is to place the main drive prime mover in such relation to the hob or cutter that it may be swiveled angularly with the hob head.

Still another object of this invention is to mount the main drive prime mover directly on the hob head to thereby transmit power most directly to the hob or cutter and also to be geared to the back shaft so that the work spindle and its workpiece and the lead screw will revolve in the required timed relationship.

Still another object of this invention is to obtain a more positive drive and accurate control of the rate of rotation of the hob.

Another object consists in positioning the main drive prime mover in substantially direct driving relationship with the hob or cutter in such a manner as to permit of its movement axially of the workpiece.

Still another object of the invention is to gain the highest possible degree of efficiency from the location of the prime mover with respect to the hob or cutter by overcoming the disadvantages of a drive system whereby the prime mover is so located as to directly transmit the bulk of its power to the back shaft and gear trains of a hobbing machine.

Other objects and advantages of my invention will become clear to those skilled in the art by reference to the accompanying drawings which illustrate a form of my invention, and to the following description of the same in which like reference characters indicate the parts throughout the same.

Figures 1, 3:
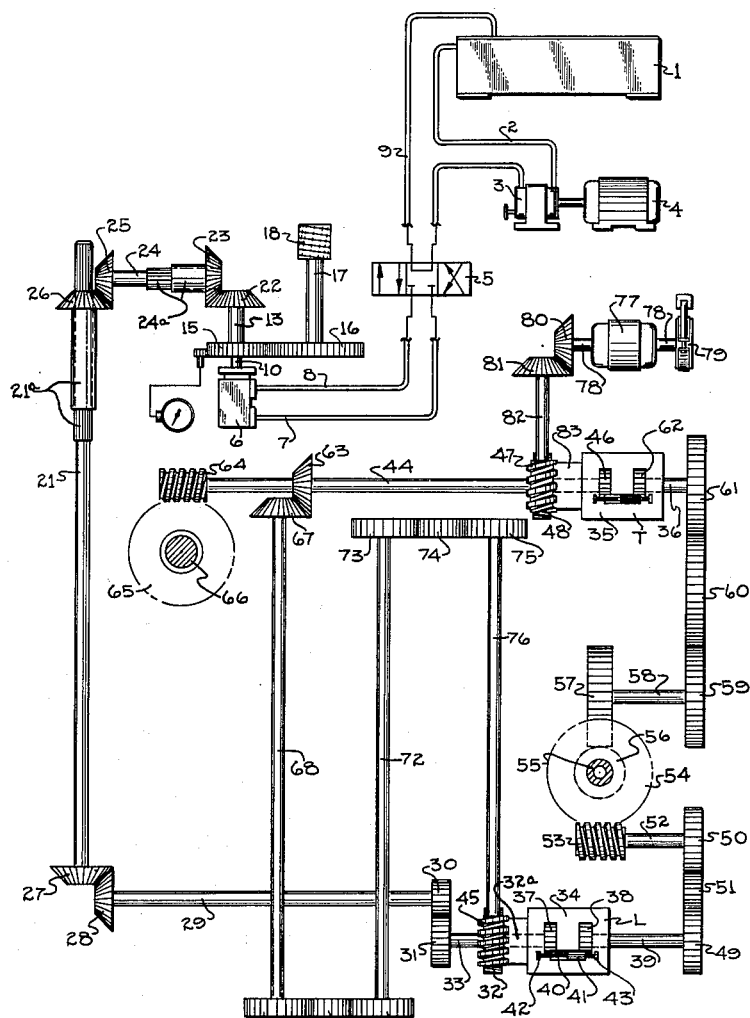
FIGURE 1 is a diagrammatic view illustrating an embodiment of my invention as it applies to a hobbing machine.
FIGURE 3 is a schematic perspective view of a portion of the differential mechanisms of FIGURE 1.
Figure 2:
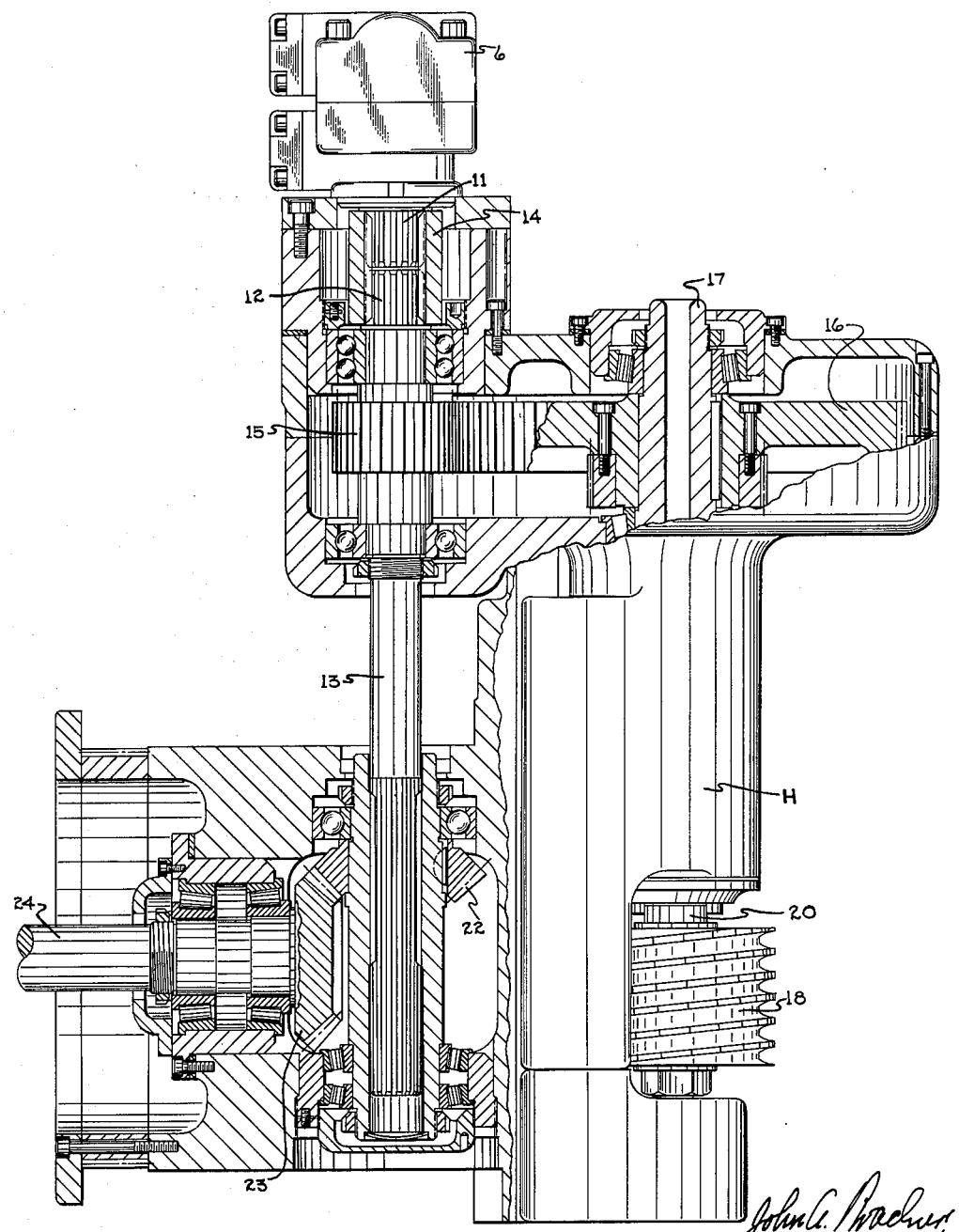
FIGURE 2 is a longitudinal view partly in section of a power source and power transmission means to the hob or cutter and to the back shaft and gear trains associated therewith.

In carrying out the objects and advantages of my invention, I have illustrated in FIGURE 1 in diagrammatic form the general organization of a mechanism for this purpose, and in FIGURE 2, an embodiment of the invention wherein the prime mover is mounted on the hob head to directly drive the hob.

A source of hydraulic fluid is carried in a tank 1 and is conveyed through a conduit 2 to a pump 3 driven by the prime mover 4. With the prime mover in operation, fluid under pressure is then delivered to a variable speed hydraulic motor after having first passed through a three-way four-position valve 5, of conventional design, and by which the direction and pressure of the fluid flowing between the pump 3 and the hydraulic motor 6 may be selected and maintained as the operation of the machine requires, depending upon the nature and required characteristics of the work to be performed. The conduits 7 and 8 connect the hydraulic motor 6 with the valve 5 while a fluid return conduit 9 is connected between the valve and fluid supply tank, thus completing the hydraulic circuit.

According to the present invention, I mount the hydraulic motor 6 directly on the swiveling portion of the hob head of the machine, the motor shaft 10 being splined inwardly of its free end, as at 11, and having an axially aligned driving connection with the upper splined end 12 of a driven shaft 13 through a splined coupling 14. A drive gear 15 is fixed on the shaft 13 and its teeth mesh with the teeth of the bull gear 16 keyed to the hob spindle 17 for driving the hob 18. The cutter or hob is mounted in the usual manner on the hob spindle which is rotatable in an arbor 20 within the hob and hob spindle housing H. Since the variable speed motor is mounted directly on the swiveling portion of the hob head and has direct driving connection with the hob or cutter, it will readily be seen that the driving connection with the back shaft 21 of the machine and through the work spindle and lead screw drives is relatively remote. This driving relationship directly between the motor and the hob or cutter, on the one hand, and remotely between the motor and the back shaft and subsequent gear trains, differentials, etc., on the other hand, provides simple, novel means by which strains, stresses, backlash, shock and the like generated by the impacts of the hob on the work piece in the hobbing operation are substantially eliminated in those areas. The result, therefore, is an extremely high degree of precision in the finished workpiece not obtainable in the past.

Thus, it will be seen that power delivered from the hydraulic motor 6 is directly transmitted to the hob spindle and thence secondarily to the back shaft 21 (FIGURE 1) by means of bevel gears 22–23, shaft 24 and bevel gears 25–26. In order to provide for vertical movement of the hob relative to the back shaft, there is the usual sliding splined drive connection 21ª between the back shaft 21 and the gear 26, and to provide "in and out" movement of the hob with respect to the workpiece, there may be a sliding splined driving connection 24ª between the shaft 24 and the gear 23.

I have found by tests under actual operating conditions in producing toothed sections that, by my simple arrangement of directly coupling the driving power source with the hob spindle as distinguished from the arrangement disclosed in the aforesaid Warner patent wherein the prime mover directly transmitted its driving power to the back shaft and thence to the gear trains supplying power to the work spindle and lead screw, undesirable and precision destroying shock waves, strains, torsional and other stresses, as well as backlash in the back shaft and gear trains to the lead screw and work spindle generated by the interrupted cuts as the cutting edges of the hob entered, passed through and then out of the workpiece, are substantially eliminated by my invention, resulting in an even higher degree of precision in the hobbing of a workpiece than was heretofore obtainable by such structures as shown in the aforesaid Warner patent and other well known driving arrangements heretofore known in the art.

Power from the driven back shaft 21 (FIGURE 1) is transmitted through the bevel gears 27, 28 to the shaft 29 and through the meshed gears 30–31 to drive this differential input shaft 33, or the gears 30 and 31 may be eliminated and the shafts 29 and 33 may be a single shaft.

Differential mechanisms, indicated generally at L and T, may be of the same type as those described and illustrated in FIGURES 1, 3 and 7, and 8 and 9, respectively, of the H. C. Warner Patent No. 2,563,982 heretofore referred to, and include rotatable frames 34 and 35, respectively, and input shafts 33 and 36, respectively.

To the inner end of input shaft 33 is secured a gear 37 and spaced from and axially aligned with the gear 37 is a gear 38 secured on one end of the shaft 39. Intermeshing differential pinion gears 40 and 41 are also respectively meshed with the gears 37 and 38. Relatively supported pinion shafts, indicated at 42 and 43 are anchored in the rotatable frame 34. The differential mechanism T preferably is constructed in like manner.

The mounting of the differential spindles, such as at 42 and 43 on the differential frame 34, is relied upon to communicate the increment of speed variation to be imparted to the gear 38 and the shaft 39 by the effect of rotation of the worm wheel 32 by motion derived from a shaft 44, since the rotational rate of the gear 38 is at a rate which is the algebraic sum of the rotational rate of the input gear 37 plus the rotational rate imparted by the worm 45 to the frame 34.

The action is similar with respect to the acceleration of rate of rotation imparted to the shaft 44 carrying the gear 46 by rotation of the frame 35 of the differential mechanism T by the driving effect of the worm 47 on the gear 48. A set or group of index gears may be variously arranged, but as illustrated in FIGURE 1, may comprise a driving index gear 49 secured to the differential output shaft 39 and a driven output index gear 50, there being one or more intermediate index gears 51 interposed between and in serial relation with the gears 49 and 50. The output index gear 50 is secured to the shaft 52. To the other end of the shaft 52 is fixed a worm pinion 53. A worm wheel 54 is rigidly fixed to the work spindle 55 whereby the work spindle is rotated at a precise or exact rotational rate by the worm pinion 53. A helical gear 56 affixed to the work spindle drives a relatively mating helical gear 57 fixed to the shaft 58, when the spindle is rotated. The driving feed gear 59 is fixed to the other end of the shaft 58 and through the gear 60, in any appropriate number, transmits driving motion to the output feed gear 61.

The output feed gear 61 is secured to an end of shaft 36, the other end of the said shaft having affixed thereto a driving gear 62 of a rapid traverse differential mechanism T which comprises the frame 35 to which is secured a worm gear 48, which during cutting feed movements of the hob is maintained non-rotatable as will be described hereinafter.

Rotary motion is communicated from the input gear 62 to the driven gear 46 fixed on the end of shaft 44, through one or more pairs of differential pinions, as described in connection with differential L.

A beveled gear 63 and a worm pinion 64 are fixed on shaft 44 in longitudinally interspaced relation. Rotational movement imparted to the shaft 44 and communicated to the worm pinion 64 causes said pinion to drive the worm gear 65 which is rigidly fixed to the lower end of the lead screw 66 whereby rotary movement is given to vertically move the hob carriage to cause the required feed movement of the hob spindle while moving transversely across the periphery of a work blank placed on the work spindle 55 and in a direction parallel to the axis of the work spindle.

Rotational movement imparted to the shaft 44 will, through the meshing bevel gears 63 and 67, drive the lead gear 69 affixed to the opposite end of the shaft 68. Interposed between the lead gears 69 and 70 and intermeshed therewith is an intermediate lead gear 71. Rotational movement of the lead gear 70 is transmitted through the shaft 72 to which it is attached and through the set of relatively intermeshed gears 73, 74 and 75, gear 73 being fixed to the shaft 72. Rotational motion is imparted to the shaft 76 to which is fixed at its end the worm 45 which is intermeshed with the worm wheel 32 fixed to the hub 32ᵃ of the rotatable lead differential frame 34.

A rapid traverse motor is indicated at 77 which has a double ended shaft 78 to which at one end a brake drum 79 is affixed and disposed in operative relation to brake shoe devices of a well known type with automatic means adapted to retract the brake shoes to release the brake concurrently with the starting of the motor 77. To the other end of the shaft 78 is fixed a bevel gear 80 which, being meshed with a bevel gear 81 fixed to shaft 82, will drive the worm wheel 48 through the worm pinion 47 which is fixed to the shaft 82 and which is in mesh with the worm wheel 48, the worm wheel 48 being carried by the hub 83 fixed to the rotatable frame 35 of the differential mechanism T.

The rapid traverse mechanism is, during hob cutting operations, inoperative and therefore the brake comprising the drums and shoes maintain the differential frame 35 non-rotatable by the locking effect of the non-reversible worm gearing 47–48.

Whenever, during the operation of the hobbing machine, the rapid traverse mechanism is operative, it is adapted to speed up the rotatable rate of the shaft 44 and thereby the lead screw 66 by the driving effect of the relatively rapidly rotating worm 47 on the worm gear 48 whereby to effect added rotational speed regardless of any concurrent rotary movement imparted to the differential gear 62 by the feed gear 61.

My invention is particularly concerned with supplying a direct drive to the hob spindle of a hobbing machine wherein the variable speed hydraulic motor 6 is mounted on and movable with the hob head to sustain a driving relationship throughout the machine substantially free from backlash, torsional and other stresses, vibration and strains resulting from the intermittent cutting action of the hob, as distinguished from the type of remote drive to the hob spindle through excessive gearing as is disclosed in the Warner patent hereinbefore referred to.

I claim:

In a gear and spline hobbing machine of the character shown and described, a work spindle, a lead screw, a hob head mounted on the machine and adjustable axially and angularly with respect to the axis of a workpiece on the work spindle, a driven hob spindle for supporting a hob or cutter thereon, a variable speed hydraulic motor mounted rigidly and directly on and movable with the hob head through its several adjusted positions as a substantially integral part of the hob head, said variable speed hydraulic motor having a direct driving relationship with the hob spindle, means producing a relative feeding motion between the hob and the workpiece, said variable speed hydraulic motor being linearly translatable in response to said feeding motion, means for rotating the workpiece in selected timed relationship with the hob, said last named means being remotely driven by said variable speed hydraulic motor whereby toothed sections may be generated in said workpiece, and rapid traverse means for quick hob head return.

References Cited by the Examiner

UNITED STATES PATENTS

| 1,656,544 | 1/1928 | Thoma | 60—53 X |
| 2,563,982 | 8/1951 | Warner | 90—4 |
| 2,943,538 | 7/1960 | Pegard | 90—4 |

FOREIGN PATENTS

| 746,561 | 1/1944 | Germany. |
| 471,236 | 8/1937 | Great Britain. |

WILLIAM W. DYER, Jr., *Primary Examiner.*

LEON PEAR, ANDREW R. JUHASZ, *Examiners.*